US012212900B2

United States Patent
Diamond et al.

(10) Patent No.: US 12,212,900 B2
(45) Date of Patent: Jan. 28, 2025

(54) AUTOMATED PROJECTOR IMAGE OPTIMIZATION SYSTEM, VEHICLE INCLUDING THE SAME, AND ASSOCIATED METHOD

(71) Applicant: Ford Global Technologies, LLC, Dearborn, MI (US)

(72) Inventors: Brendan Diamond, Grosse Pointe, MI (US); Ryan Edwin Hanson, Livonia, MI (US); John Robert Van Wiemeersch, Novi, MI (US); Keith Weston, Canton, MI (US); Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 57 days.

(21) Appl. No.: 18/060,400

(22) Filed: Nov. 30, 2022

(65) Prior Publication Data

US 2024/0179283 A1 May 30, 2024

(51) Int. Cl.
*H04N 9/31* (2006.01)
*A63F 13/27* (2014.01)
(Continued)

(52) U.S. Cl.
CPC .......... *H04N 9/3194* (2013.01); *A63F 13/27* (2014.09); *G01S 13/867* (2013.01); *H04N 5/63* (2013.01);
(Continued)

(58) Field of Classification Search
CPC ........ G03B 29/00; G03B 21/00; H04N 9/317; H04N 9/3185; H04N 9/3194; H04N 5/63;
(Continued)

(56) References Cited

U.S. PATENT DOCUMENTS 6,687,515 B1 * 2/2004 Kosaka ................. H04M 19/04
348/14.02
9,992,465 B1 * 6/2018 Schreiber ............. H04N 9/3194
(Continued)

FOREIGN PATENT DOCUMENTS

CN 115416459 A * 12/2022 ............ B60J 5/0473
WO WO-2019079790 A1 * 4/2019 ......... G02B 27/0093

OTHER PUBLICATIONS

Alex Davies, Ford Reckons Your Self-Driving Car Needs a Movie Projector, Wired, Transportation, Mar. 9, 2016, 1-9.

*Primary Examiner* — John W Miller
*Assistant Examiner* — Humam M Satti
(74) *Attorney, Agent, or Firm* — Frank Lollo; Eversheds Sutherland (US) LLP

(57) ABSTRACT

An automated projector image optimization (APIO) system for a vehicle having a control system is provided. The APIO system includes a projector configured to display an image, a processor configured to be electrically connected to the control system, and a memory having instructions that, when executed by the processor, cause the processor to perform operations including receiving a user input corresponding to a display surface, determining a preferred orientation of the projector relative to the display surface, and employing the control system to move the vehicle so that the projector is in the preferred orientation.

20 Claims, 10 Drawing Sheets

(51) Int. Cl.
*G01S 13/86* (2006.01)
*H04N 5/63* (2006.01)
*B60W 60/00* (2020.01)

(52) U.S. Cl.
CPC ......... *H04N 9/3182* (2013.01); *B60W 60/001* (2020.02)

(58) Field of Classification Search
CPC .......... H04N 9/3182; B60R 2011/0021; B60R 2011/004–005; B60R 11/02; B60R 16/023; B60Q 2800/10; B60Q 5/00; A63F 13/27; G01S 13/867; B60W 60/001; B60W 2050/146; B60W 2420/403; B60W 50/14; B60G 17/052; B60G 2202/152
See application file for complete search history.

(56) References Cited

U.S. PATENT DOCUMENTS

| | | | |
|---|---|---|---|
| 9,994,148 B1 * | 6/2018 | Kim | B60Q 5/006 |
| 10,394,112 B2 | 8/2019 | Johnson et al. | |
| 2006/0268233 A1 | 11/2006 | Sato | |
| 2008/0143889 A1 * | 6/2008 | Mukaida | H04N 5/775 348/789 |
| 2010/0030425 A1 * | 2/2010 | Holbrook | B60G 17/0155 280/6.153 |
| 2012/0327315 A1 * | 12/2012 | Larsen | H04N 9/317 348/744 |
| 2017/0297502 A1 | 10/2017 | Kim et al. | |
| 2019/0096297 A1 * | 3/2019 | Cary | B60Q 1/545 |
| 2020/0404232 A1 * | 12/2020 | Choi | H04N 9/3188 |
| 2022/0244066 A1 | 8/2022 | Kunii et al. | |

\* cited by examiner

AUTOMATED PROJECTOR IMAGE OPTIMIZATION SYSTEM, VEHICLE INCLUDING THE SAME, AND ASSOCIATED METHOD

BACKGROUND

Projector systems for vehicles are known. More specifically, it is known to mount projectors to different components of vehicles and display images from the projectors on various display surfaces. For example, FIG. 1 shows a vehicle 2 and projector system 40 therefor, in which the projector system 40 is mounted to a rear door 4 of the vehicle 2. As shown, a number of individuals 6,8,10 are watching an image 42 from the projector system 40 on a display screen 44.

The projector system 40 relies on an operator (e.g., one of the individuals 6,8,10) to ensure that the projector system 40 is properly positioned and focused. This leads to situations in which the individuals 6,8,10 may view images that have improper dimensions, distortion, brightness, improper contrast, and/or where sound may not properly be heard from the projector system 40. Further yet, some vehicles with projector systems do not have feedback mechanisms to correct the image clarity, if needed.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
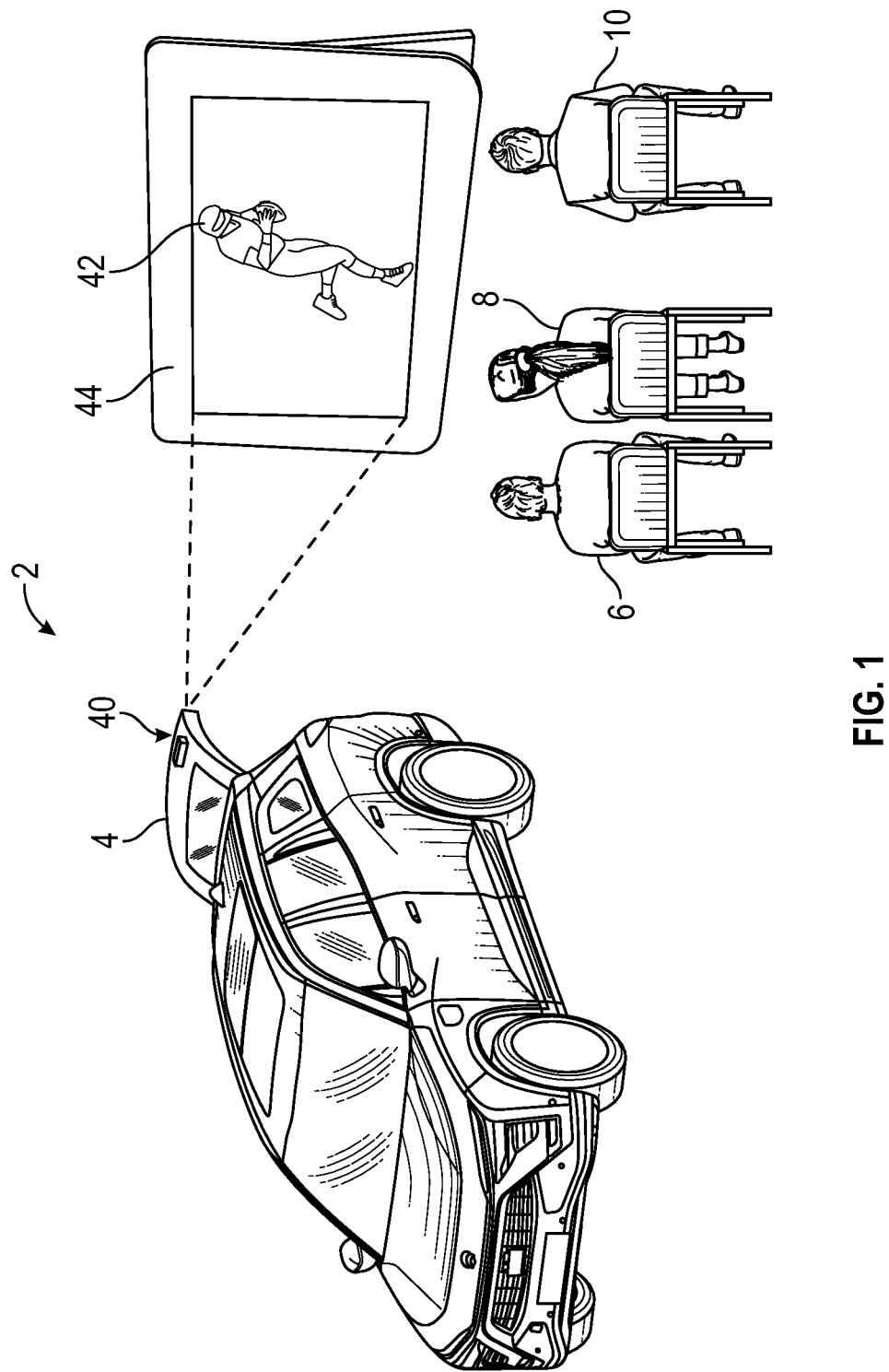
FIG. 1 is a view of a vehicle and projector system therefor, and is shown with a number of individuals and a display screen.

The systems, apparatuses, and methods disclosed herein assist at least in part in allowing individuals to enjoy experiences associated with projectors mounted in vehicles. They do this by automating the projector experience. For example, vehicle projectors in accordance with the disclosed concept may project onto different surfaces, such as a garage door of a house. Individuals, either through mobile devices or infotainment screens of the vehicle, for example, may provide user input corresponding to the display surface. This may be in the form of a location of the display surface. In response, the processor of the vehicle may determine a preferred orientation of the projector relative to the display surface. This may be done in a number of different ways, including referencing a look up table associated with the projector, which may have different specifications of the projector.

Once the processor has determined the preferred orientation of the projector relative to the display surface, the processor may employ a vehicle control system to move vehicle so that the projector is in the preferred orientation. The control system may include an autonomous driving system that initially moves the vehicle. That is, once the preferred orientation is known, the autonomous driving system moves the vehicle to that orientation. In turn, image quality can be clearer, as compared to vehicles that are not automatically aligned with display surfaces.

Additionally, the control system of the vehicle may include a camera, a light sensor, and a radar system. These aspects allow the processor of the vehicle to be able to control the volume of speakers of the vehicle and the quality of the image of the projector. For example, if the camera and light sensor determine that it is relatively dark out, the processor may cause the projector to adjust a brightness level, a contrast ratio, and/or an image sharpness. In another example, if the camera and radar system determine that individuals are positioned a certain distance from the vehicle, the processor can cause speakers of the vehicle to adjust a volume and/or move a window from a CLOSED position to an OPEN position so that the individuals can better hear the sound. In yet another example, the vehicle may use piezoelectric transducers, as taught in U.S. Pat. Nos. 11,044,566 and 10,708,700, the contents of which are incorporated herein by reference in their entireties, to deliver audio to the exterior of the vehicle by using vehicle sheet metal as the cone of a speaker driven by a piezoelectric transducer mounted to the interior surface of the sheet metal or body exterior trim.

In yet another example, if the display surface is not a preferred surface (e.g., is not flat), the processor can send alert notifications to mobile devices or an infotainment screen of the vehicle recommending that the vehicle be moved. The processor may also cause the projector to pause or power down if the camera transmits data to the processor corresponding to individuals not being present. In this manner, the vehicle's power can better be conserved.

Furthermore, the vehicle is configured to function as a remote gaming hub. For example, the processor of the vehicle may be wirelessly connected to a remote gaming system, thereby allowing an individual to play a game, such as an Xbox game, with the projector of the vehicle. This feature may also allow other external systems to utilize the projector of the vehicle, such as allowing emergency news to be broadcast with the projector.

Illustrative Embodiments

As employed herein, the term "projector" shall mean an output device that projects an image, including video images, onto a surface.

Figure 2:
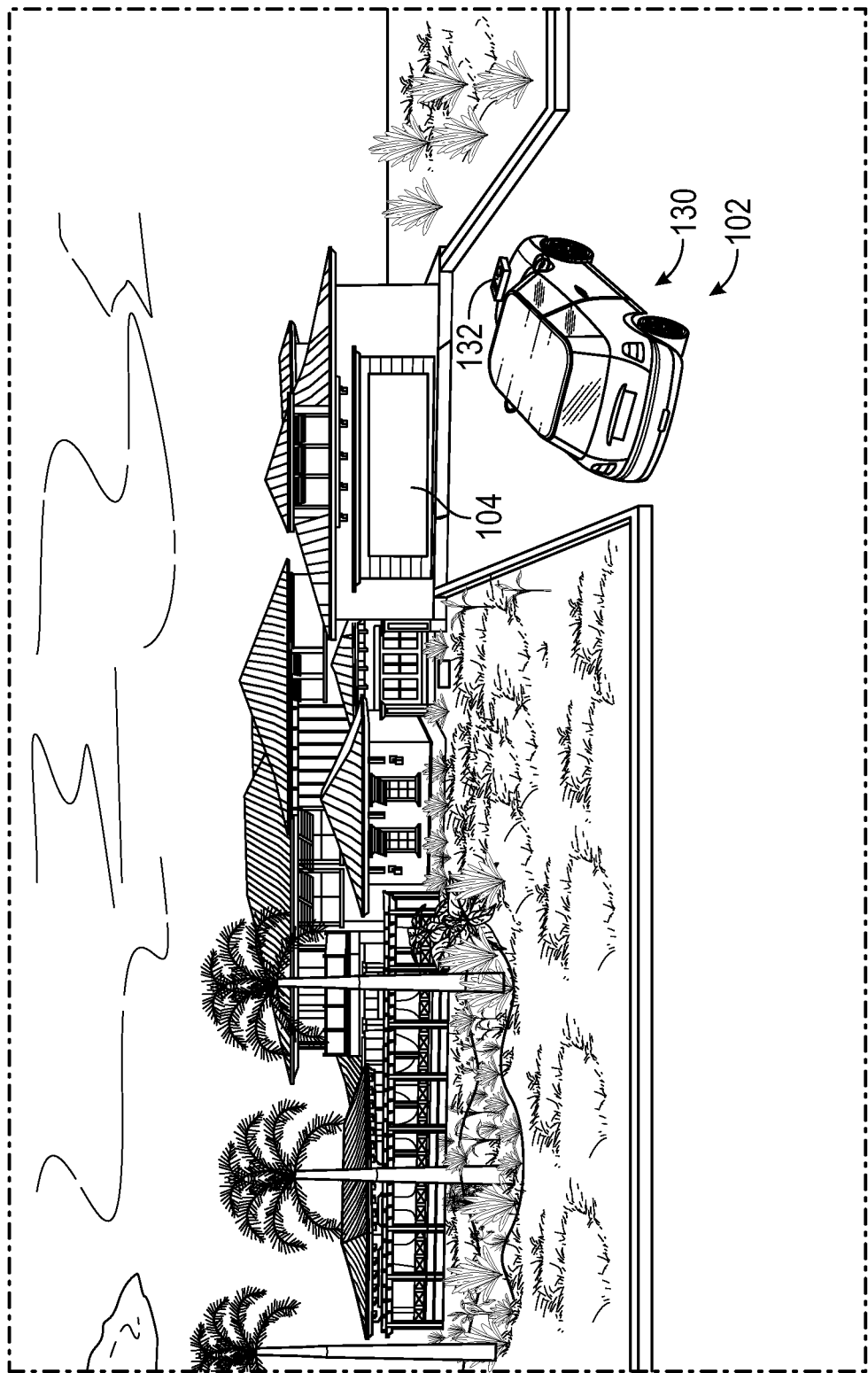
FIG. 2 shows a vehicle and automated projector image optimization (APIO) system therefor, and is shown positioned by a house, in accordance with one non-limiting embodiment of the disclosed concept.
Figure 3:
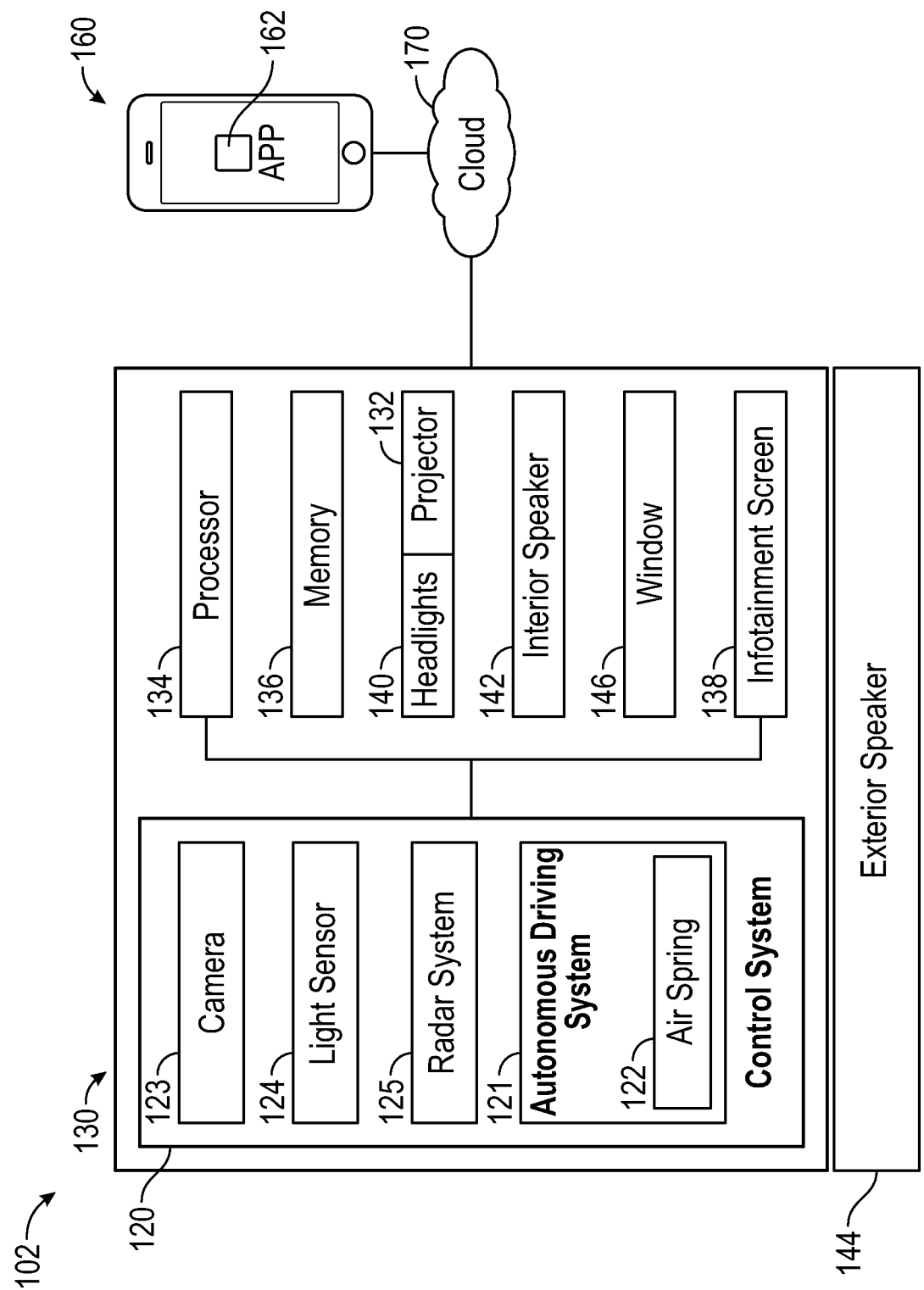
FIG. 3 shows a simplified view of the vehicle and APIO system therefor of FIG. 2, and is shown as employed with a mobile device.

FIG. 2 shows a vehicle 102 and automated projector image optimization (APIO) system 130 therefor, and FIG. 3 shows a simplified view of the vehicle 102 and APIO system 130 therefor, in accordance with one non-limiting embodiment of the disclosed concept. It will be appreciated that the vehicle 102 may take the form of a passenger or commercial automobile such as, for example, a performance vehicle, a car, a truck, a crossover vehicle, a sport utility vehicle, a van, a minivan, a taxi, a bus, etc., and may be configured and/or programmed to include various types of automotive drive systems. Additionally, in one example embodiment, the vehicle 102 may be configured as an electric vehicle (EV). More particularly, the vehicle 102 may include a battery EV (BEV) drive system or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 102 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 102 may have a control system 120 (FIG. 3) having an autonomous driving system 121 (FIG. 3) that is configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features.

A vehicle having Level-1 autonomy may include a single automated driver assistance feature, such as steering or acceleration assistance. Adaptive cruise control is one such example of a Level-1 autonomous system that includes aspects of both acceleration and steering.

Level-2 autonomy in vehicles may provide driver assist technologies such as partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as accelerating past a slow-moving vehicle, while the present driver remains ready to retake control of the vehicle if the system is unable to execute the task.

Level-4 AVs can operate independently from a human driver, but may still include human controls for override operation. Level-4 automation may also enable a self-driving mode to intervene responsive to a predefined conditional trigger, such as a road hazard or a system event.

Level-5 AVs may include fully autonomous vehicle systems that require no human input for operation, and may not include human operational driving controls.

As shown in FIG. 3, the APIO system 130 includes a projector 132 mounted to headlights 140 of the vehicle 102, a processor 134 electrically connected to the control system 120, and a memory 136. As will be discussed below, the vehicle 102 and APIO system 130 therefor are advantageously configured to control movement and orientation of the projector 132 relative to a display surface. In one example, a display surface is provided in the form of a garage door 104 of a house, such that the projector 132 projects an image onto the garage door 104. It will, however, be appreciated that other display surfaces are contemplated herein, e.g., a side of a mountain 304 (FIG. 4E), side of a house, back of a house, side of a work building, and/or a display screen (not shown). Accordingly, among other benefits, controlling movement and orientation of the projector 132 will make images from the projector 132 appear clearer on the garage door 104.

In order to achieve the aforementioned advantage, the memory 136 has instructions that, when executed by the processor 134, cause the processor 134 to perform operations including receiving a user input corresponding to a display surface (e.g., the garage door 104), determining a preferred orientation of the projector 132 relative to the garage door 104, and employing the control system 120 to move the vehicle 102 so that the projector 132 is in the preferred orientation.

In one example, the autonomous driving system 121 of the control system 120 autonomously moves the vehicle 102 to initially orient the projector 132 to the preferred orientation. This is advantageous in that individuals no longer must attempt to manually align their vehicles with display surfaces (e.g., guess at having proper alignment). In accordance with the disclosed concept, the vehicle 102 and APIO system 130 therefor may be automatically aligned with the garage door 104 for preferred viewing. As will be discussed further below, in addition to properly seeing images on the garage door 104, the vehicle 102 and APIO system 130 therefor may allow for preferred listening that corresponds to the projector 132.

For example, FIG. 2 shows the vehicle 102 and APIO system 130 therefor in a first position with respect to the garage door 104. In this position, the processor 134 is configured to receive a user input corresponding to the garage door 104. This may be in the form of a user (e.g., an owner of the vehicle 102) placing the vehicle 102 in "PROJECTOR MODE" (e.g., on the infotainment screen 138) and defining a desired surface (e.g., the garage door 104) where the driver would like to display an image of the projector 132.

More specifically, and referring again to FIG. 3, the vehicle 102 may further have an infotainment screen 138 electrically connected to the processor 134, and one or more mobile devices (e.g., mobile phone 160) may be configured to be wirelessly connected to the processor 134. The infotainment screen 138 and the mobile phone 160 allow individuals to communicate to the processor 134 information about the display surface, which in the example of FIG. 2 is the garage door 104. For example, user input about the display surface may be provided at one of the infotainment screen 138 and an app 162 (FIG. 3) on the mobile phone 160. That is, an individual may define a specific surface to be projected on and/or may define a screen size, or simply define a maximum/minimum screen size. In turn, the processor 134 of the vehicle 102 will determine an appropriate distance to the display surface from which the projector 132 can be positioned. Defaults of the processor 134 of the vehicle 102 regarding an ideal screen size, based on specifications of the projector 132, resolution and contrast, may also be employed to help define an ideal range of screen sizes as well.

As stated, the autonomous driving system 121 may allow a user to initially orient the projector 132. Accordingly, rather than manually moving the vehicle 102 to orient the projector 130, as is the case with the vehicle 2 (FIG. 1), the autonomous driving system 121 automatically moves the vehicle 102 to the preferred orientation. Compare, for example, the position of the projector 132 in FIG. 2 to the position of the projector 132 in FIG. 4A, e.g., with respect to the garage door 104.

Figure 4A:
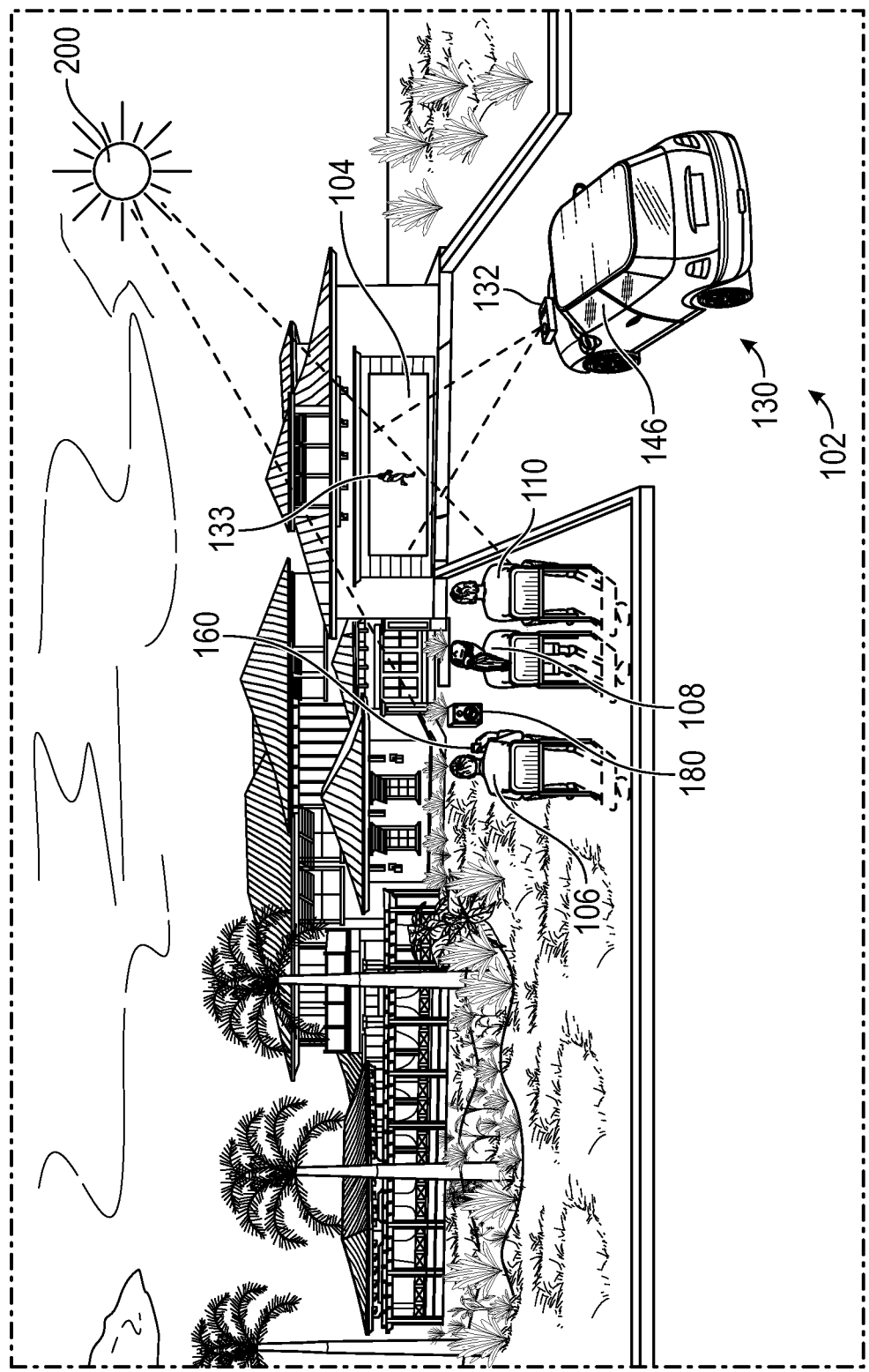
FIGS. 4A and 4B show the vehicle and APIO system therefor of FIG. 2, and show the vehicle and associated projector moved to different preferred orientations.

In the example of FIGS. 2 and 4A, after the processor 134 has received user input corresponding to the garage door 104 (e.g., in the aforementioned manner), the processor 134 next determines a preferred orientation of the projector 132 relative to the garage door 104. Determining the preferred orientation may include having the processor 134 reference a look up table for defining how large an image of the projector 132 will be at various distances with respect to the garage door 104. The processor 134 of the vehicle 102 can reference the look up table to determine how far to place the vehicle 102 and associated projector 132 from the display surface using radar and ultrasonic sensors. The look up table can reference cloud stored specifications for the projector 132. Once the preferred orientation is determined, the processor 134 may be configured to store a GPS location, vehicle determined dead reckoning position of the display surface (e.g., garage door 104), or a Radar/LiDAR or UWB obtained position of the garage door 104 and the preferred orientation. For example, one or more sensors could be placed on opposing corners of the projection surface, and the distance can be measured using UWB ToF, including its angle in X, Y, & Z planes. This may save time for orienting the projector 132 with respect to the garage door 104 in a future use.

Once the processor 134 has determined a preferred orientation of the projector 132 with respect to the garage door 104, as stated, the processor 134 is configured to employ the control system 120 to move the vehicle 102 so that the projector 132 is in the preferred orientation. In a preferred embodiment, the processor 134 employs the autonomous driving system 121 to move the vehicle 102 to the preferred orientation such that the projector 132 is oriented perpendicular relative to the garage door 104. That is, the processor 134 of the vehicle 102 will reference the location of the projector 132 and determine the desired orientation such that the garage door 104 will be oriented perpendicular to the projector 132 (e.g., see how a longitudinal dimension of the vehicle 102 is perpendicular to the garage door 104). If necessary, the vehicle 102 will use an autonomous valet park assist feature to adjust the position of the vehicle 102 and to ensure the projector 132 can display and focus properly on a given surface.

In one example, the autonomous driving system 121 includes an air spring 122 (FIG. 3), and employing the control system 120 includes employing the air spring 122 to adjust a pitch and an angle of the vehicle 102 with respect to the garage door 104. In other words, the vehicle 102 employs variable ride height via the air spring 122 to adjust pitch and angle (e.g., front and rear, and side to side).

Figure 4B:
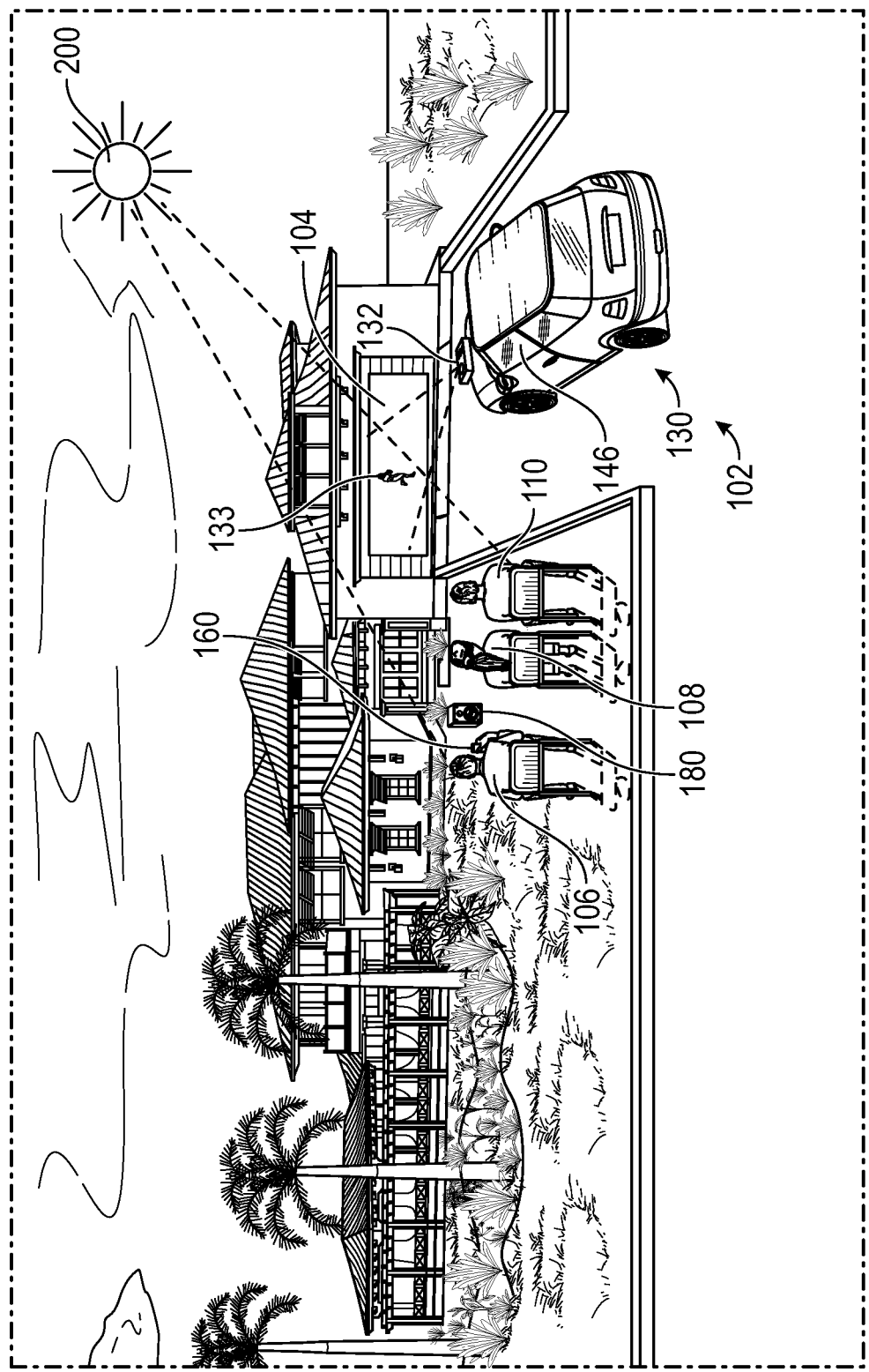
Figure 4C:
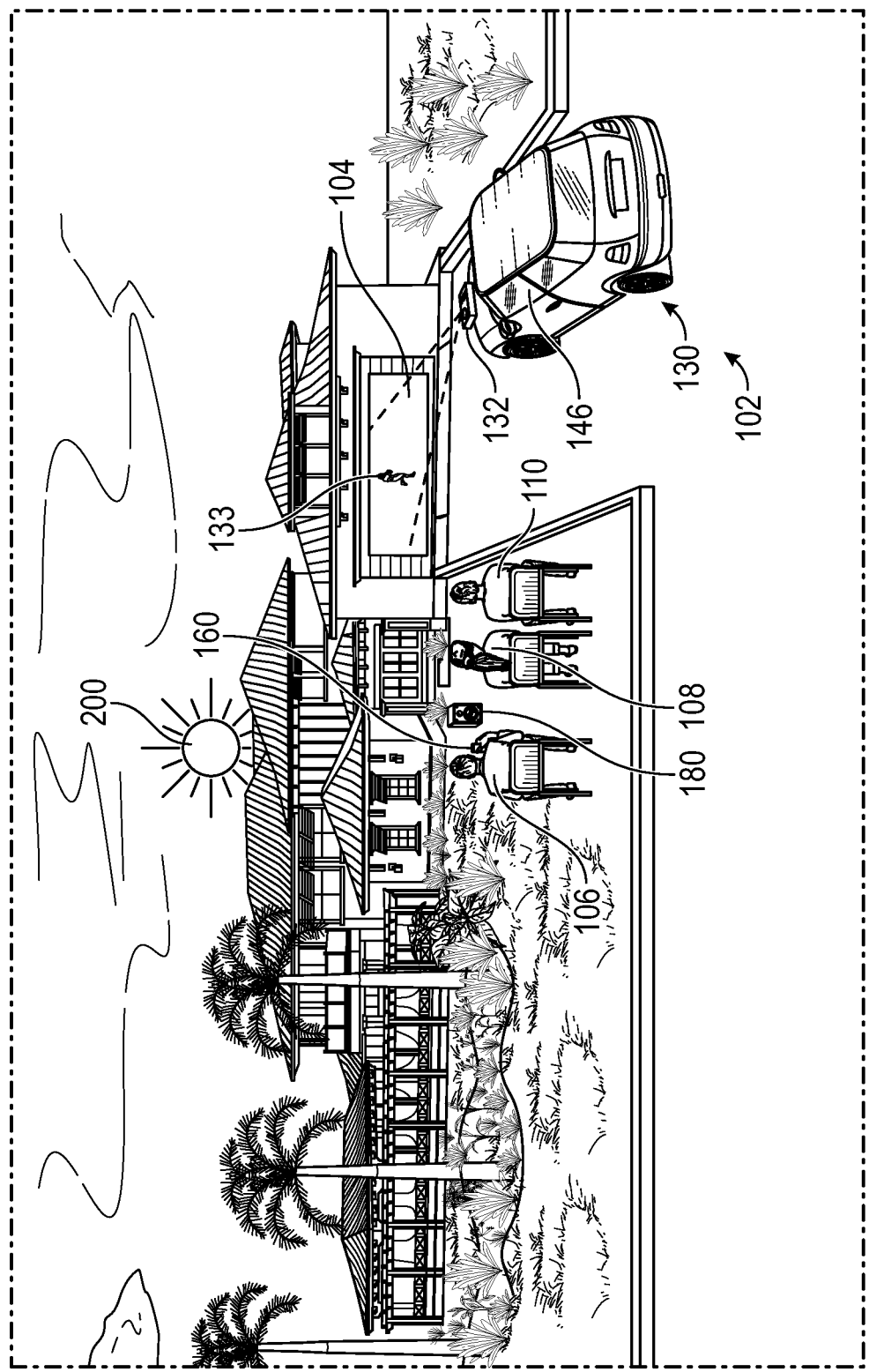
FIG. 4C shows the vehicle and APIO system therefor of FIGS. 4A and 4B, and shows the sun moved to a different position.

Referring again to FIG. 3, the control system 120 further includes a camera 123 and a light sensor 124 (collectively referred to as the vehicle sensor suite), and a radar system 125 each electrically connected to the processor 134. Additionally, the vehicle 102 further includes an interior speaker 142, an exterior speaker 144, and a window 146. The camera 123 and the light sensor 124 may be configured to estimate environmental brightness. For example, as shown in FIGS. 4A and 4B, the sun 200 is shining brightly over the individuals 106,108,110 as they are watching the image 133 on the garage door 104. However, as shown in FIG. 4C, the sun 200 has begun to set, a position which casts a shadow over the individuals 106,108,110. The APIO system 130 is configured to account for such a shadow.

More specifically, as the camera 123 and the light sensor 124 measure environmental brightness, the instructions of the memory 136 cause the processor 134 to adjust the image 133 based on the environmental brightness. In other words, the image 133 from the projector 132 is configured to be adjusted by the processor 134 in real time based on the sun 200 and surrounding environment. Adjusting the image 133 in this manner may include adjusting at least one of a brightness level of the image 133, a contrast ratio of the image 133, a color of the image 133, and a sharpness of the image 133. Further, the processor 134 may adjust at least a brightness level of the image 133, a contrast ratio of the image 133, a color of the image 133, and a sharpness on a portion of the image 133 as the sunset casts a changing shadow on image 133. These methods are desirable for the individuals 106,108,110, who might otherwise view, for example, an unclear or overly bright image, such as might be the case for the individuals 6,8,10 viewing the image 42 in FIG. 1. Additionally, the processor 134 may recommend that one of the individuals 106,108,110 (e.g., via the infotainment screen 138 and/or the mobile phone 160) move the vehicle 102 to a shaded/covered/dark area for better visibility based on an expected and/or observed position of the sun 200.

A preset display calibration process can be performed using feedback to help determine the appropriate settings of the projector 132, such as adjusting colors until some boxes are no longer visible. This may help in evaluating the contrast of displayed images, and/or adjusting color, for example. Additionally, such brightness settings of the vehicle 102 may attempt to minimize power consumption, when possible. The ideal display brightness and ambient light measurement can be calibrated during vehicle development for a variety of different environmental inputs and screen sizes.

In addition to contrast, brightness, and the other aforementioned aspects of the image 133, the APIO system 130 is configured to control the image 133 in other ways. For example, the projector 132 may be mounted to the headlights 140 (e.g., or another location of the vehicle 102) such that the projector 132 may pivot and/or rotate up and down. In this manner, the processor 134 of the vehicle 102 may control a height of the image 133 via movement of the projector 132 relative to the headlights 140, and based on user input (e.g., through at least one of the infotainment screen 138 and the mobile phone 160). Further, in cases where the vehicle 102 cannot position itself perfectly square to the projection surface, the processor 134 may complete the alignment by electronically adjusting the image 133 to remove any pin cushion effect or other image stretching attributes in order to bring the image 133 into a classic rectangular shape to ensure greatest image clarity.

As seen in FIGS. 4B and 4C, the vehicle 102 and APIO system 130 therefor are in different positions. This may be because of the position of the sun 200. For example, as the sun 200 has set (e.g., moving from FIG. 4B to FIG. 4C), the instructions of the memory 136 (FIG. 3) cause the processor 134 to either send an alert notification to a device (e.g., the mobile phone 160 of the individual 106) to move the vehicle 102, or employ the autonomous driving system 121 of the control system 120 to further move the vehicle 102, responsive to the estimation of environmental brightness from the camera 123 and the light sensor 124.

Stated differently, once the camera 123 and the light sensor 124 have transmitted data to the processor 134 corresponding to the environmental brightness, the processor 134 is configured to either send a wireless alert notification to mobile devices (e.g., mobile phone 160) of the individuals 106,108,110 or employ the control system 120 (e.g., the autonomous driving system 121) to automatically move the vehicle 102. Such an alert notification may be to the mobile phone 160 to move the vehicle 102 in order to make the image 133 more clear, based on the amount of sunlight. The APIO system 130 therefore allows the individuals 106,108,110 to continue to enjoy (e.g., view) the projector 132 independent of the environment.

In addition to measuring environmental brightness, the camera 123 is further configured to measure a color of a given display surface (e.g., the garage door 104). As such, the instructions of the memory 136, when executed by the processor 134, further cause the processor 134 to adjust an output color of the image 133 of the projector 132 based on the color of the garage door 104.

Figure 4D:
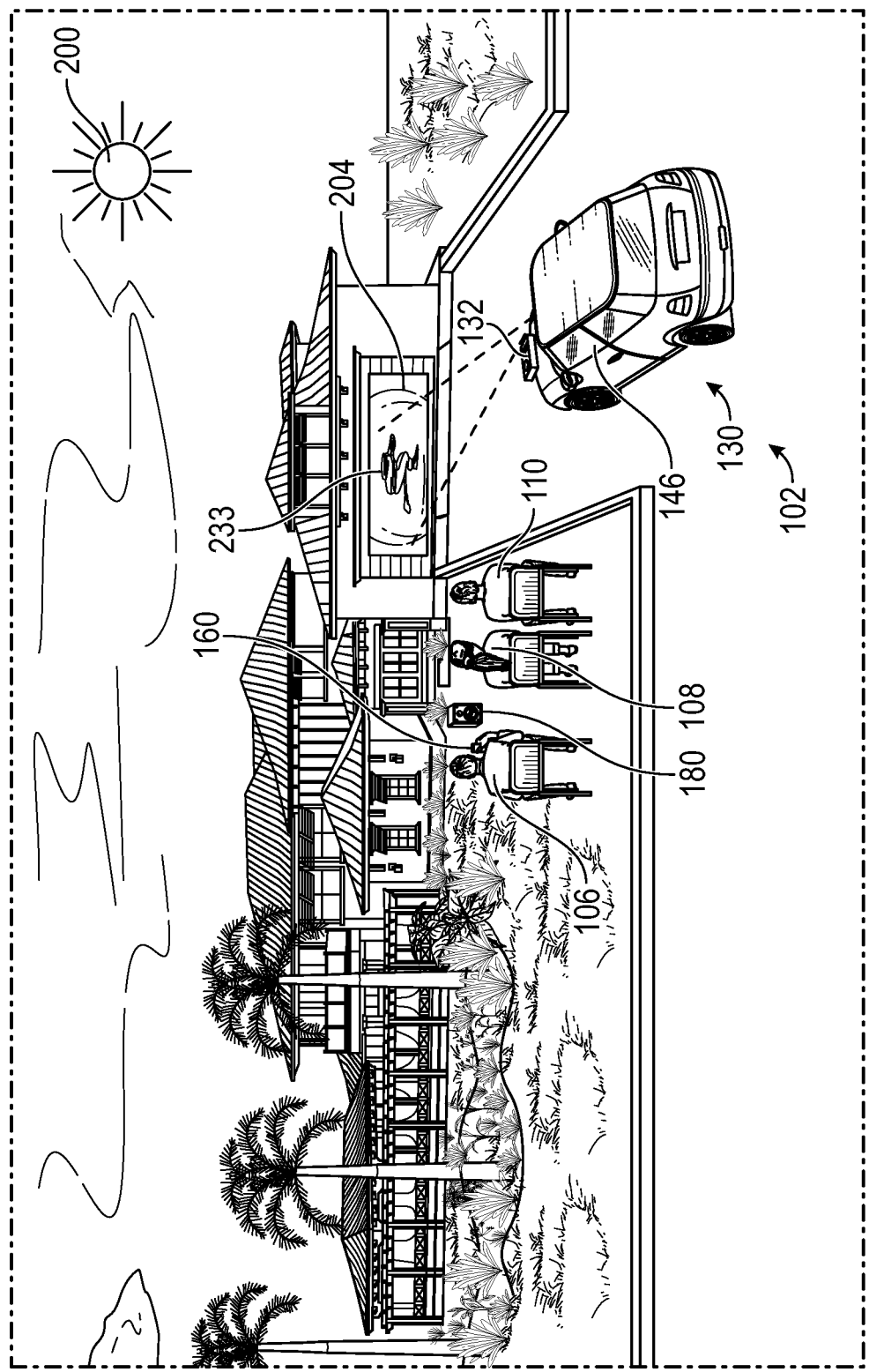
FIG. 4D shows the vehicle and APIO system therefor of FIGS. 4A and 4B, and is shown with a different display surface.

In another example, the APIO system 130 is configured to determine if a given display surface is preferred for viewing or not. For example, FIG. 4D shows the vehicle 102 and APIO system 130 therefor positioned with the individuals 106,108,110 viewing an image 233 on a different display surface (e.g., dented garage door 204). In such a situation, the camera 123 may capture images of the dented garage door 204 and transmit data corresponding to the dented garage door 204 to the processor 134 (FIG. 3). The processor 134 may then send an alert notification to a device (e.g. mobile phone 160 and/or the infotainment screen 138 (FIG. 3)) if the dented garage door 204 is not a preferred display surface. The alert notification may have instructions to move to another display surface or to cover the dent with a flat surface (ex., piece of cardboard or paper that matches the larger surface color). Accordingly, if a given display surface is not flat enough (e.g., is not a preferred display surface), the processor 134 of the vehicle 102 can recommend via sending an alert to the infotainment screen 138 or the mobile phone 160, that the image location be changed or the non-flat location be modified.

In yet another example, the camera 123 may be configured to transmit data to the processor 134 corresponding to a clarity level of the image 133 (FIGS. 4A-4C). Correspondingly, the instructions of the memory 136 may cause the processor 134 to send another alert notification to the mobile phone 160 and/or the infotainment screen 138 if the clarity level from the camera 123 is not a preferred clarity level. The second alert notification may have instructions for a user to cause the vehicle 102 to be moved closer to the display surface. As such, if the image is relatively unclear, the processor 134 may send an alert to the mobile phone 160 or the infotainment screen 138 instructing the individuals 106,108,110 that moving the vehicle 102 would be a good idea to make the resolution more clear.

Figure 4E:
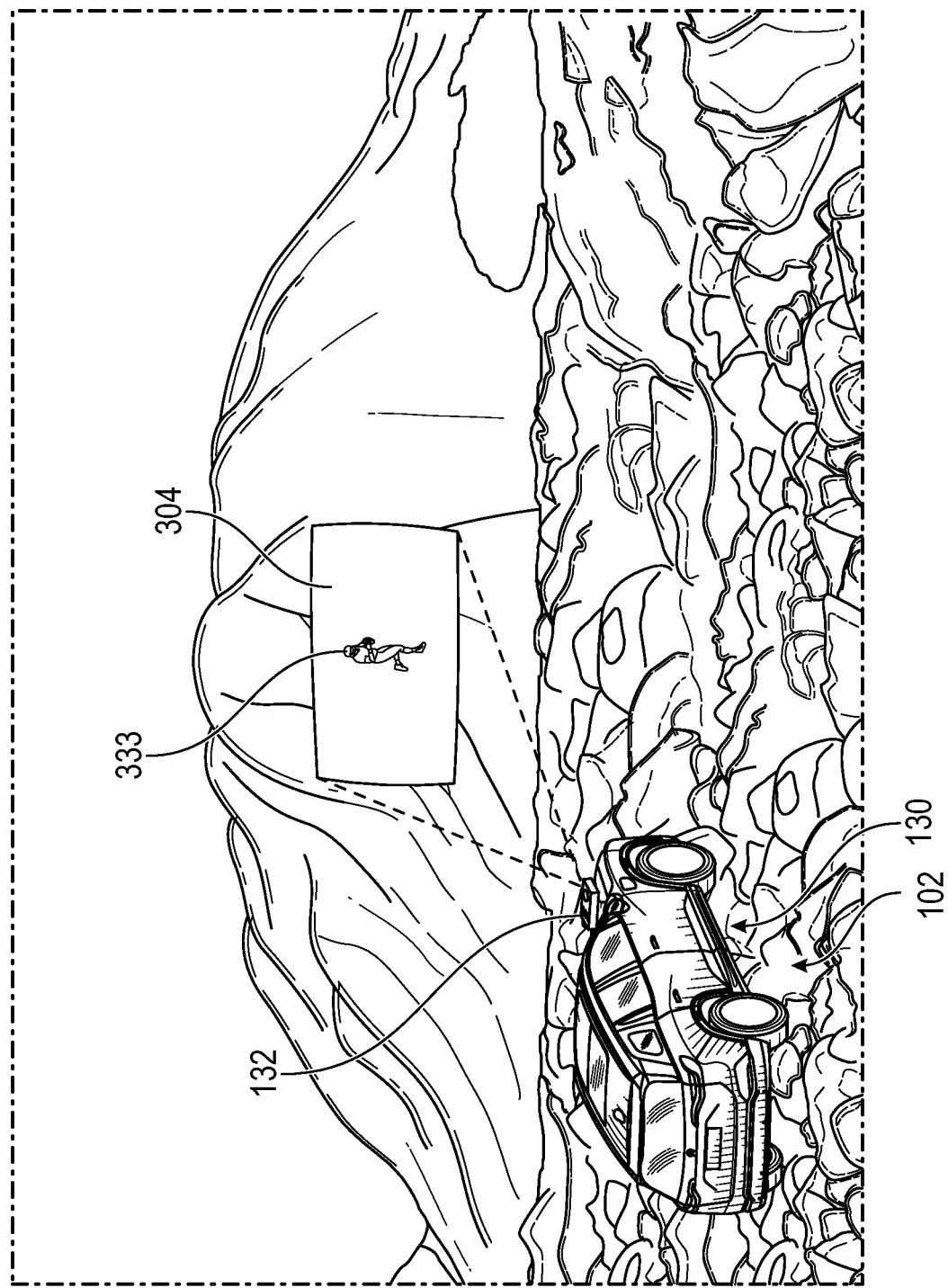
FIG. 4E shows the vehicle and APIO system therefor of FIGS. 4A-4D, and is shown with the vehicle positioned by a mountain.

In another example, the camera 123 may further be configured to determine whether individuals are proximate the vehicle 102. In the example of FIG. 4E, although the projector 132 is projecting an image 333 onto the side of a mountain 304, there are no individuals present. The camera 123 of the vehicle 102 is configured to transmit data to the processor 134 corresponding to the presence, or absence, of individuals. Accordingly, the instructions of the memory 136, when executed by the processor 134, further cause the processor 134 to either remove power to the projector 132 or pause the projector 132 if individuals are not proximate the vehicle 102. This may save power of the vehicle 102 and/or allow individuals to resume watching without losing their spot, when they return to the vehicle 102.

Continuing to refer to FIG. 4E, it will be appreciated that the vehicle 102 may be positioned using a terrain reading for non-uniform surfaces (e.g., off road). The camera 123 and the light sensor 124 (e.g., the exterior sensor suite) may scan the terrain and recommend vehicle positions. In this manner, the vehicle 102 may utilize the terrain such that the vehicle 102 is in a preferred location relative to the side of the mountain 304 (or shear cliff).

In addition to adjusting the clarity of the picture of the image 133 (FIGS. 4A-4C), the APIO system 130 is configured to adjust volume, in order to provide for an overall pleasant experience for the individuals 106,108,110. For example, the interior and exterior speakers 142,144 are each configured to play sound associated with the projector 132. Furthermore, the instructions of the memory 136, when executed by the processor 134, further cause the processor 134 to determine a distance of individuals from the vehicle 102 with the camera 123 and the radar system 125, and adjust a volume of the interior speaker 142 and a volume of the exterior speaker 144 based on the distance. This is desirable because, for example, at times individuals are positioned relatively close to the vehicle 102. In such a situation, overly loud sounds from the speakers 142,144 are undesirable. Similarly, when individuals are positioned relatively far away from the speakers 142,144, relatively loud sounds from the speakers 142,144 are desirable. Thus, adjustments of volume from the speakers 142,144 in this regard are desirable.

Moreover, the processor 134 of the vehicle 102 is further configured to control the volume associated with the projector 132. For example, the camera 123 of the vehicle 102 may transmit data to the processor 134 corresponding to a location of any one of the individuals 106,108,110 (e.g., a distance of the individuals 106,108,110 from the vehicle 102). Accordingly, the instructions of the memory 136 may cause the processor 134 to move the window 146 from a CLOSED position to an OPEN position so that the volume of the interior speaker 142 will increase relative to the individuals 106,108,110, if the distance is greater than a predetermined distance. In this manner, the vehicle 102 can advantageously further tailor the experience of using the projector 132 by adjusting the volume heard from the interior speaker 142 with the window 146.

In another example, as shown in FIG. 4A, audio may be provided to the individuals 106,108,110 via a Bluetooth® speaker 180 that is wirelessly connected to the processor 134 of the vehicle 102. Audio may also be provided to mobile devices, e.g., a speaker associated with the mobile phone 160. In this manner, the individuals 106,108,110 may enjoy the experience of the projector 130 by listening from any of a plurality of sources, e.g., the speakers 142,144, the mobile phone 160, and/or the Bluetooth® speaker 180. In cases where Bluetooth® audio is used, the controller 134 may provide a synchronization adjustment feature on the GUI of the vehicle infotainment screen 138 and/or the GUI of the mobile 160 which can be used to null out any delay in audio relative to action or speech on the moving image 133.

Furthermore, the mobile phone 160 may further be wirelessly connected to the processor 134 in order to allow the mobile phone 160 to function as a remote control for the projector 132. Employing the mobile phone 160 in this manner (e.g., as a remote control and/or to emanate volume) may occur via the individual 106 placing the phone in REMOTE mode and/or SPEAKER mode. In addition to the mobile phone 160, the processor 134 is configured to function as a hot-spot in order to transmit WI-FI audio to any number of mobile devices. The same Bluetooth® and/or WI-FI connection to mobile devices can also, as stated above, provide for Pause, Fast Forward, Rewind, Volume Control, and/or other remote-control functions like a standard television remote control. Further, the media content projected on the surface 104, 304, and 404 may originate from one of the mobile devices 160 which may wirelessly relay the video to the projector 132 of the vehicle 102, or the media content may originate from a front or rear infotainment system sold or installed in the vehicle 102.

Additionally, the camera 123 and the radar system 125 may also be employed to estimate a size of the image 133. In turn, the processor 134 of the vehicle 102 may employ the autonomous driving system 121 to change the position of the projector 132 with respect to the garage door 104 in order to realize a corrected image size.

Figure 5:
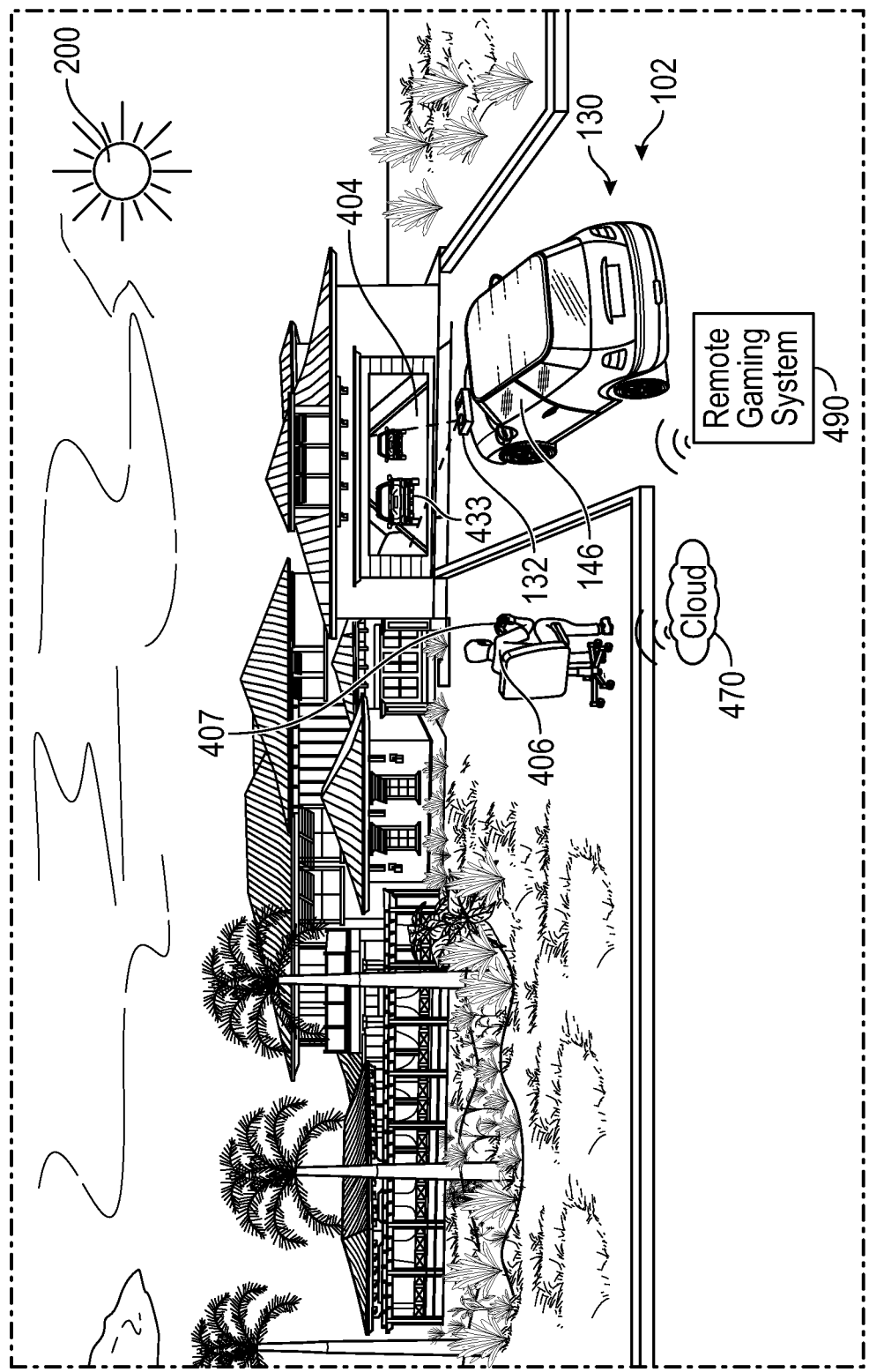
FIG. 5 shows the vehicle and APIO system therefor of FIGS. 4A-4E, and is shown as employed with a remote gaming system.

In another example embodiment of the disclosed concept, FIG. 5 shows an instance in which the vehicle 102 functions as a remote gaming hub. Specifically, the vehicle 102 is shown connected to a remote gaming system 490 via a cloud 470. The remote gaming system 490 may be any suitable gaming system, such an Xbox Series X. As shown, an individual 406 has a game controller 407 and is playing a game. The game is being projected onto a display surface (e.g., garage door 404) via the projector 132. As such, the individual 406 is able to connect with the remote gaming system 490, which may be located at a remote location, and play the game on the garage door 404 via the projector 132, such that the vehicle 102 functions as a remote gaming hub. Such a feature of the APIO system 130 may occur with the vehicle 102 in park (e.g., not moving). In another example, such a feature, e.g., wirelessly connecting the projector 132 to an external system, may allow emergency news to be broadcasted through the projector 132.

Figure 6:
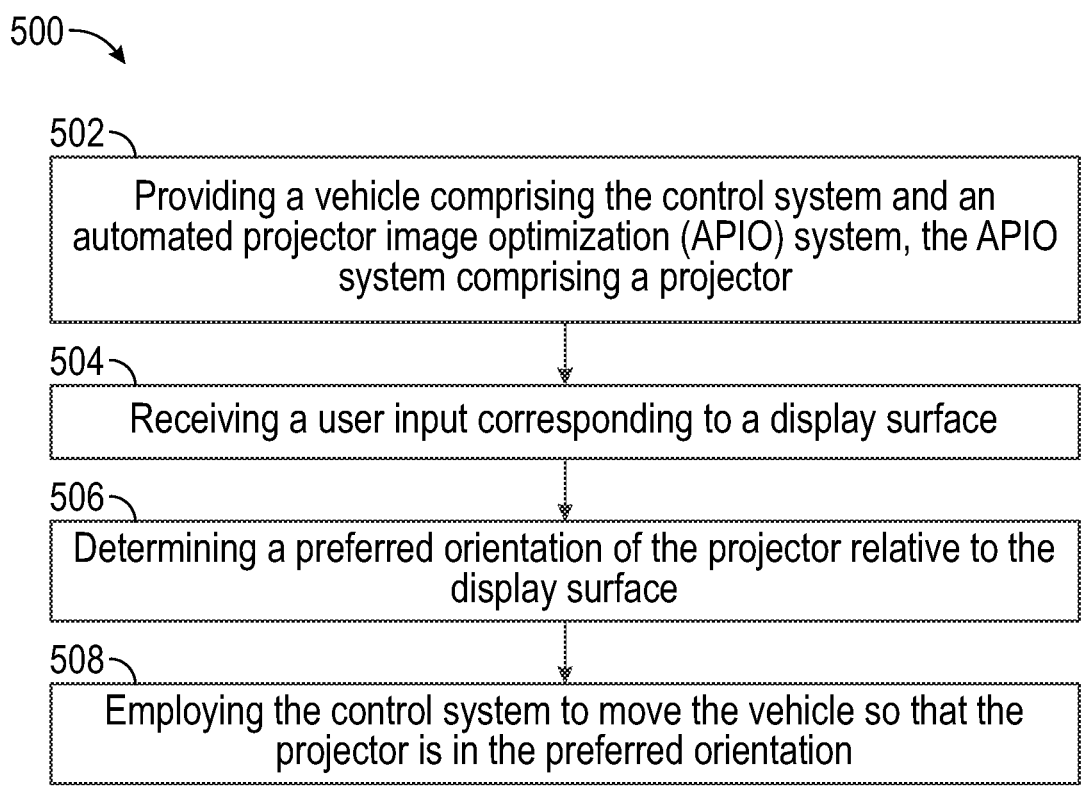
FIG. 6 shows an example method of optimizing an automated projector image with a control system.

FIG. 6 shows an example method 500 of optimizing an automated projector image with a control system 120. The method 500 includes a first step 502 of providing the vehicle 102 with the control system 120 and the APIO system 130, a second step 504 of receiving a user input corresponding to a display surface 104,304, a third step 506 of determining a preferred orientation of the projector 132 relative to the display surface 104,304, and a fourth step 508 of employing the control system 120 to move the vehicle 102 so that the projector 132 is in the preferred orientation. In one example embodiment, the method 500 further includes steps of wirelessly connecting a remote gaming system 490 to the processor 134 of the vehicle 102, and providing as the automated projector image the image 433 from the remote gaming system 490 such that the vehicle 102 functions as a remote gaming hub.

In one more embodiment, the vehicle 102 may include piezoelectric transducers electrically connected to the processor 134, as taught in U.S. Pat. Nos. 11,044,566 and 10,708,700, the contents of which are incorporated herein by reference in their entireties. Accordingly, the vehicle 102 further has a piezoelectric transducer electrically connected to the processor 134 and mounted to an interior of the vehicle, as well as a sheet metal frame. As a result, the instructions, when executed by the processor 134, further cause the processor 134 to perform the operation including employing the transducer to deliver audio to an exterior of the vehicle 102 using the sheet metal frame as a cone of a speaker driven by the transducer. It will also be appreciated that glass, trim, and sheet metal piezoelectric microphones may be employed as sensors in order to take audible commands from customers to adjust aspect of the system 130. Moreover, the mobile phone 160 may also be employed for speech recognition in order to control the system 130.

Accordingly, the disclosed concept provides for a new (e.g., more enjoyable) automated projector image optimization system 130, vehicle 102 including the same, and associated method, in which a projector image 133,333,433 with associated audio levels are automated for preferred viewing and listening, thereby allowing individuals 106,108, 110,406 to better enjoy using the projector 132.

Additionally, the processor 134 of the vehicle 102 may be a commercially available general-purpose processor, such as a processor from the Intel® or ARM® architecture families. The memory 136 of the vehicle 102 may be a non-transitory computer-readable memory storing program code, and can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.).

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. An automated projector image optimization (APIO) system for a vehicle having a control system, the APIO system comprising:
    a projector configured to display an image;
    a processor configured to be electrically connected to the control system; and
    a memory comprising instructions that, when executed by the processor, cause the processor to perform an operation comprising:
        receive a user input corresponding to a first display surface;
        determine that the first display surface is a non-flat surface;
        present an indication that the first display surface is a non-flat surface or cause the vehicle to autonomously re-position to a second display surface;
        receive data indicative of a terrain proximate to the second display surface;
        determine, based on the data, a recommended position of the vehicle relative to the second display surface;
        determine a preferred orientation of the projector relative to the second display surface; and
        employ the control system to move the vehicle so that the projector is in the preferred orientation and the vehicle is in the recommended position.

2. The system according to claim 1, wherein the preferred orientation is provided when the projector is oriented perpendicular relative to the second display surface.

3. The system according to claim 2, wherein the instructions, when executed by the processor, further cause the processor to perform the operation comprising:
    store a Radar/LiDAR obtained position of the second display surface and the preferred orientation.

4. The system according to claim 2, wherein the instructions, when executed by the processor, further cause the processor to perform the operation comprising:
    send an alert notification to a device if the first display surface is not a preferred display surface, the alert notification having instructions to move to another display surface.

5. The system according to claim 4, wherein the alert notification is a first alert notification, and wherein the instructions, when executed by the processor, further cause the processor to perform the operation comprising:
    send a second alert notification to the device if a clarity level of the image is not a preferred clarity level, the second alert notification having instructions for a user to cause the vehicle to be moved closer to the second display surface.

6. The system according to claim 1, wherein determining the preferred orientation comprises referencing a look up table for defining how large the image of the projector will be at various distances with respect to the second display surface.

7. The system according to claim 1, wherein the vehicle further has an infotainment screen electrically connected to the processor, and wherein the user input is provided at the infotainment screen.

8. A vehicle comprising:
    a control system; and
    an automated projector image optimization (APIO) system, the APIO system comprising:
        a projector configured to display an image;
        a processor configured to be electrically connected to the control system, and
        a memory comprising instructions that, when executed by the processor, cause the processor to perform an operation comprising:
            receive a user input corresponding to a first display surface;
            determine that the first display surface is a non-flat surface;
            present an indication that the first display surface is a non-flat surface or cause the vehicle to autonomously re-position to a second display surface;
            receive data indicative of a terrain proximate to the second display surface;
            determine, based on the data, a recommended position of the vehicle relative to the second display surface;
            determine a preferred orientation of the projector relative to the second display surface; and
            employ the control system to move the vehicle so that the projector is in the preferred orientation and the vehicle is in the recommended position.

9. The vehicle according to claim 8, wherein the control system comprises a camera, a light sensor, a radar system, and an autonomous driving system each electrically connected to the processor.

10. The vehicle according to claim 9, wherein the autonomous driving system comprises an air spring, and wherein employing the control system further comprises employing the air spring to adjust a pitch and an angle of the vehicle with respect to the second display surface.

11. The vehicle according to claim 9, wherein the camera and the light sensor are configured to estimate an environmental brightness, and wherein the instructions, when executed by the processor, are configured to cause the processor to perform the operation comprising:

adjust the image based on the environmental brightness.

12. The vehicle according to claim 11, wherein adjusting the image comprises adjusting a brightness level of the image, a contrast ratio of the image, a color of the image, and a sharpness of the image.

13. The vehicle according to claim 11, wherein the instructions, when executed by the processor, further cause the processor to perform the operation comprising:

either send an alert notification to a device to move the vehicle or employ the control system to further move the vehicle, responsive to the environmental brightness.

14. The vehicle according to claim 9, wherein the camera is configured to measure an amount of sunlight, and wherein the instructions, when executed by the processor, further cause the processor to perform the operation comprising:

send an alert notification to a device to move the vehicle in order to make the image more clear, based on the amount of sunlight.

15. The vehicle according to claim 9, wherein the camera is configured to measure a color of the second display surface, and wherein the instructions, when executed by the processor, further cause the processor to perform the operation comprising:

adjust an output color of the image of the projector based on the color of the second display surface.

16. The vehicle according to claim 9, wherein the camera is configured to determine whether individuals are proximate the vehicle, and wherein the instructions, when executed by the processor, further cause the processor to perform the operation comprising:

either remove power to the projector or pause the projector if the individuals are not proximate the vehicle.

17. The vehicle according to claim 9, wherein the vehicle further comprises an interior speaker and an exterior speaker each configured to play sound associated with the projector, and wherein the instructions, when executed by the processor, further cause the processor to perform the operation comprising:

determine a distance of individuals from the vehicle with the camera and the radar system, and adjust a volume of the interior speaker and a volume of the exterior speaker based on the distance.

18. The vehicle according to claim 17, wherein the vehicle has a window, a piezoelectric transducer electrically connected to the processor and mounted to an interior of the vehicle, and a sheet metal frame, and wherein, and wherein the instructions, when executed by the processor, further cause the processor to perform the operation comprising:

move the window from a CLOSED position to an OPEN position so that the volume of the interior speaker will increase relative to the individuals if the distance is greater than a predetermined distance, and employ the transducer to deliver audio to an exterior of the vehicle using the sheet metal frame as a cone of a speaker which is driven by the transducer.

19. A method of optimizing an automated projector image with a control system, the method comprising:

providing a vehicle comprising the control system and an automated projector image optimization (APIO) system, the APIO system comprising a projector;

receiving a user input corresponding to a first display surface;

determining that the first display surface is a non-flat surface;

presenting an indication that the first display surface is a non-flat surface or causing the vehicle to autonomously re-position to a second display surface;

receiving data indicative of a terrain proximate to the second display surface;

determining, based on the data, a recommended position of the vehicle relative to the second display surface;

determining a preferred orientation of the projector relative to the second display surface; and employing the control system to move the vehicle so that the projector is in the preferred orientation and the vehicle is in the recommended position.

20. The method according to claim 19, further comprising:

wirelessly connecting a remote gaming system to a processor of the vehicle; and providing as the automated projector image an image from the remote gaming system such that the vehicle functions as a remote gaming hub.

\* \* \* \* \*